United States Patent
Hansmann et al.

(10) Patent No.: US 7,030,517 B2
(45) Date of Patent: Apr. 18, 2006

(54) MOBILE DEVICES POWER SERVER

(75) Inventors: Uwe Hansmann, Altdorf (DE); Lothar Merk, Weil im Schoenbuch (DE); Dieter E. Staiger, Weil im Schoenbuch (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 09/683,662

(22) Filed: Jan. 31, 2002

(65) Prior Publication Data

US 2002/0113578 A1    Aug. 22, 2002

(30) Foreign Application Priority Data

Jan. 31, 2001    (EP) ................. 01102210

(51) Int. Cl.
*H02J 7/00* (2006.01)
(52) U.S. Cl. .................... 307/150; 307/64
(58) Field of Classification Search ........... 307/80, 307/82, 150, 64, 66
See application file for complete search history.

(56) References Cited

U.S. PATENT DOCUMENTS

| | | | | |
|---|---|---|---|---|
| 5,336,984 A | * | 8/1994 | Mischenko et al. | 320/108 |
| 5,382,893 A | * | 1/1995 | Dehnel | 320/160 |
| 5,578,875 A | | 11/1996 | Dormer et al. | 307/66 |
| 5,907,464 A | * | 5/1999 | Maloney et al. | 361/111 |
| 5,913,926 A | * | 6/1999 | Anderson et al. | 714/6 |
| 6,266,220 B1 | * | 7/2001 | Lahoud | 361/58 |
| 6,348,744 B1 | * | 2/2002 | Levesque | 307/86 |
| 6,459,175 B1 | * | 10/2002 | Potega | 307/149 |
| 6,549,968 B1 | * | 4/2003 | Hart | 710/303 |
| 2004/0075418 A1 | * | 4/2004 | Densham et al. | 320/111 |

* cited by examiner

*Primary Examiner*—Robert L. Deberadinis
(74) *Attorney, Agent, or Firm*—Lawrence Harbin; Derek S. Jennings

(57) ABSTRACT

A mobile device (power supplying device) includes a mobile device power server (MD PS) for providing power to another mobile device (power receiving device) having no external power supply connection. The (MD PS) may be integrated into the power supplying mobile device or may be provided as a separate portable connector usable as a connection between the power supplying mobile device and an external power supply adapter.

11 Claims, 4 Drawing Sheets

MOBILE DEVICES POWER SERVER

BACKGROUND OF INVENTION

1. Field of the Invention

The present invention is related to a mobile device (power supplying device) having a mobile devices power server (MD PS) for providing power to another mobile device (power receiving device).

2. Background of the Invention

Many mobile devices, like handheld computers, cellular phones or personal digital assistants, have a power sub system & battery charger. The power sub system & battery charger provides the required power for the operation of the components of the mobile device, e.g. display, processor, memory. The power subsystem & battery charger is provided with power from an external power supply when the mobile device is connected with an external power supply.

The use of an external power supply for a mobile device requires a device specific power supply adapter normally provided with the device. The power supply adapter receives an ACV (alternate current voltage) and converts it into a VDC (direct current) required by the sub system & battery charger of the mobile device.

Traveling with different types of mobile devices requires for each mobile device its own device specific power supply adapter. Taking into consideration that sockets of external power supplies are not internationally standardized an additional country specific external power supply adapter for each mobile device is required.

U.S. Pat. No. 5,578,875 discloses an alternative power supply apparatus for use in connection with systems having a base unit connected to an external power supply and an associated battery powered portable unit. The alternative power supply apparatus includes two rechargeable batteries one of which serves to provide electrical power to the portable unit.

There are two ports associated with the base unit, each port operably and detachably accepts one of the two rechargeable batteries. The apparatus further includes a voltage regulator which provides regulated voltage to circuitry in the base unit. Two current sources each associated with a respective one of the two ports provides an electrical current to the batteries when they are operable accepted by the ports. The second rechargeable battery, which is interchangeable with the first battery, provides a source voltage to the voltage regulator upon failure of the external power supply. The teaching of that US patent does not address how to provide power to several mobile devices concurrently by avoiding the use of a device specific power supply adapter for each mobile device.

SUMMARY OF INVENTION

It is therefore a feature of the present invention to provide a new device for providing power to mobile devices avoiding unnecessary plug connections.

It is further a feature of the present invention to provide a new device for providing power to several mobile devices concurrently avoiding the use of an own device specific power supply adapter for each mobile device.

It is still further a feature of the present invention to provide a new device for providing power from one mobile device to another one in the case no external power supply is available.

Finally, it is still yet another feature of the present invention to provide a new system for providing power to several mobile devices concurrently avoiding unnecessary device specific as well as country specific power supply adapter.

Consistent with the features stated above the present invention includes a mobile device (power supplying device) having a mobile device power server ((MD PS)) for providing power to another mobile device (power receiving device) having no external power supply connection, wherein the (MD PS) may be integrated into the power supplying mobile device.

Further consistent with the features stated above the present invention includes a mobile device (power supplying device) having a mobile device power server ((MD PS)) for providing power to another mobile device (power receiving device) having no external power supply connection, wherein the (MD PS) may be provided as a separate portable connector usable as connection between a power supplying mobile device and external power supply adapter.

DETAILED DESCRIPTION

The (MD PS) preferably comprises a voltage regulator circuit receiving an input voltage from an external power supply adapter, generating a reference voltage requested by the receiving mobile device and providing the reference voltage to its output port providing connection to the power receiving device.

In a preferred implementation the (MD PS) further comprises a reference voltage generator and a protection circuit.

Figure 1:
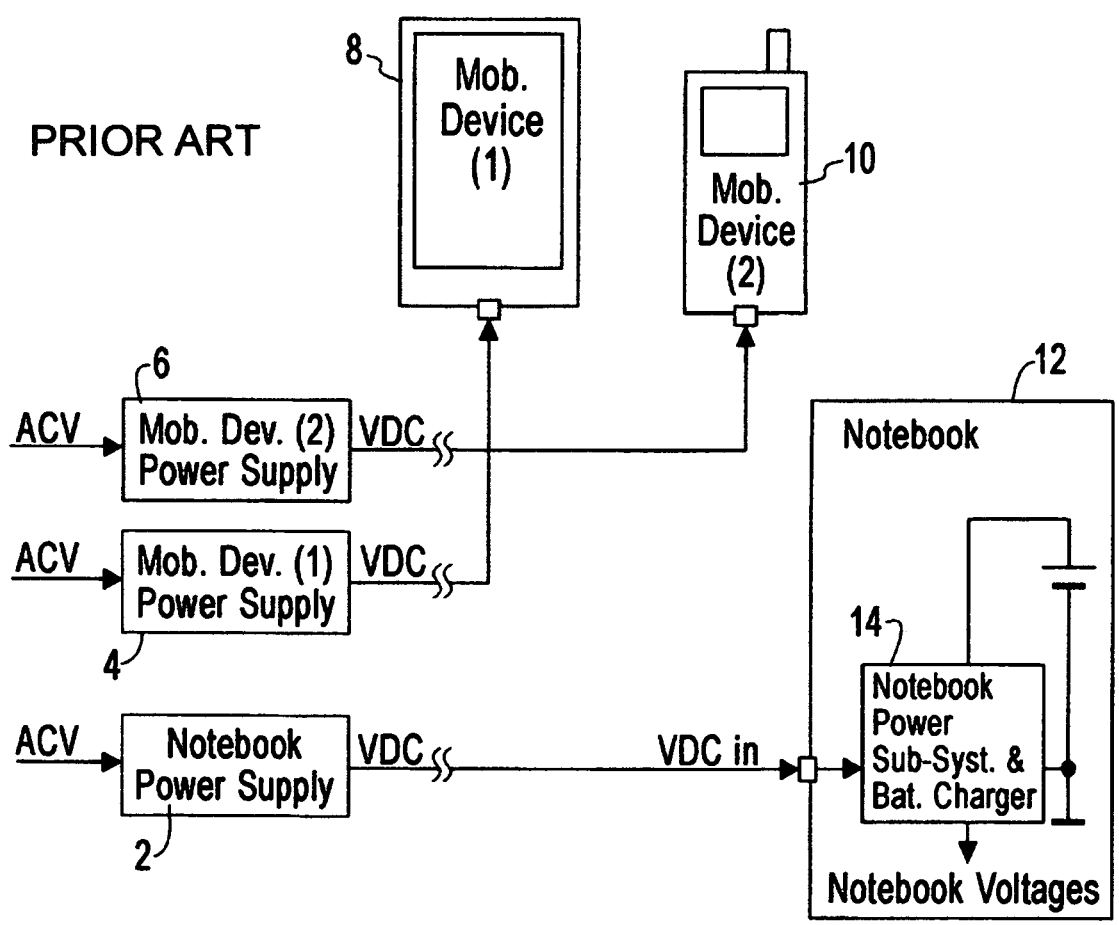
FIG. 1 shows a prior art system for supplying power via the external power supply to mobile devices.

FIG. 1 shows a standard prior art system for providing power via an external power supply to a mobile device, e.g. notebook device (12), mobile phone (10) or personal digital assistant (8). Each mobile device requires its own device specific power supply adapter (2,4,6) for converting the power (ACV) received from the external power supply into VDC. Furthermore, each mobile device has an own power sub system & battery charger (14) providing all components of the mobile device with the required power. Traveling with several mobile devices like mobile phone and personal assistant would require to use all those device specific power supply adapters.

Figure 2:
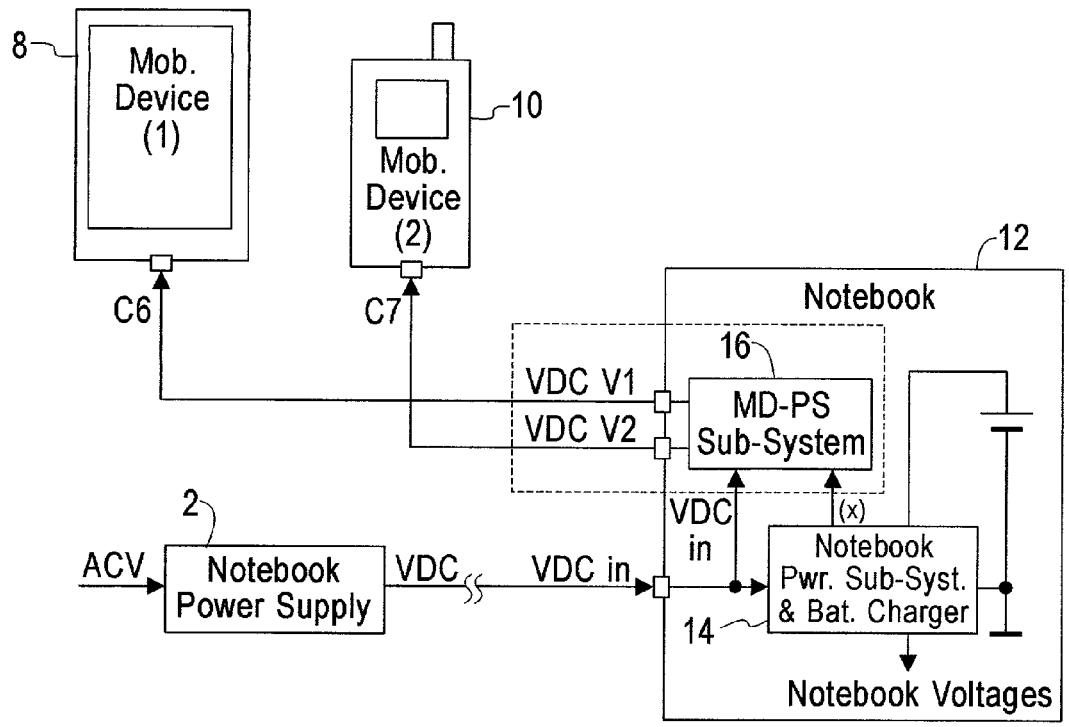
FIG. 2 shows a preferred implementation of the present invention integrated into a notebook device.

FIG. 2 shows a preferred implementation of the present invention integrated into a notebook.

In this implementation the notebook is the power supplying device. The notebook (12) is provided with external power via its belonging external power supply adapter (2). The power supply adapter (2) provides a defined VDC being requested by the power subsystem & battery charger (14) of the notebook (16). The Mobile Device Power Server ((MD PS)) (16) contains for each power receiving device (8, 10) a separate voltage regulator (See FIG. 4) for providing the required VDCV1 or VDCV2. The VDC V1 and VDC V2 are provided via the corresponding serial ports to the appropriate power receiving devices (8, 10).

A further advantageous feature of the (MD PS) may be that the power sub system & battery charger of the power supplying system provides power from the internal battery of the notebook (12) via the connection X to the (MD PS) when no external power supply is available.

Figure 3:
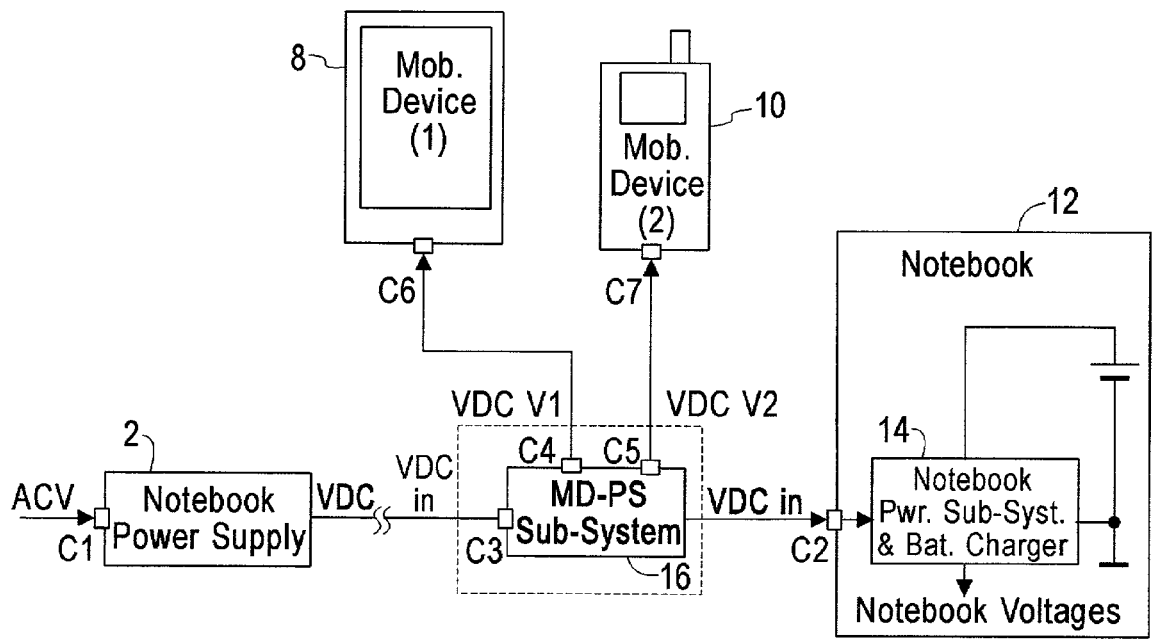
FIG. 3 shows an another preferred implementation of the present invention available as a separate component connectable with a notebook device.

FIG. 3 shows a further preferred implementation of the present invention available as a separate component connectable with a notebook or the power supplying device.

This implementation shows a (MD PS) (16) as a separate portable component being functionally identical with the (MD PS) integrated into the power suppling device as described to FIG. 2.

MP PS (16) has a port (C4) for the power receiving device (8) requesting VDC Vi, a port (CS) for the power receiving device (10) requesting VDC V2, a port (C3) for the external power supply adapter (2) and a connection to the power supplying mobile device (12). (MD PS) (16) may be built into the power supply connection between the external power supply adapter (2) and its assigned port (C2) of the power supplying mobile device (12).

A further advantageous feature of the present invention may realized by a power sub system & battery charger having an additional output providing power via an additional connection to the (MD PS) if no external power supply is available (not shown).

Figure 4:
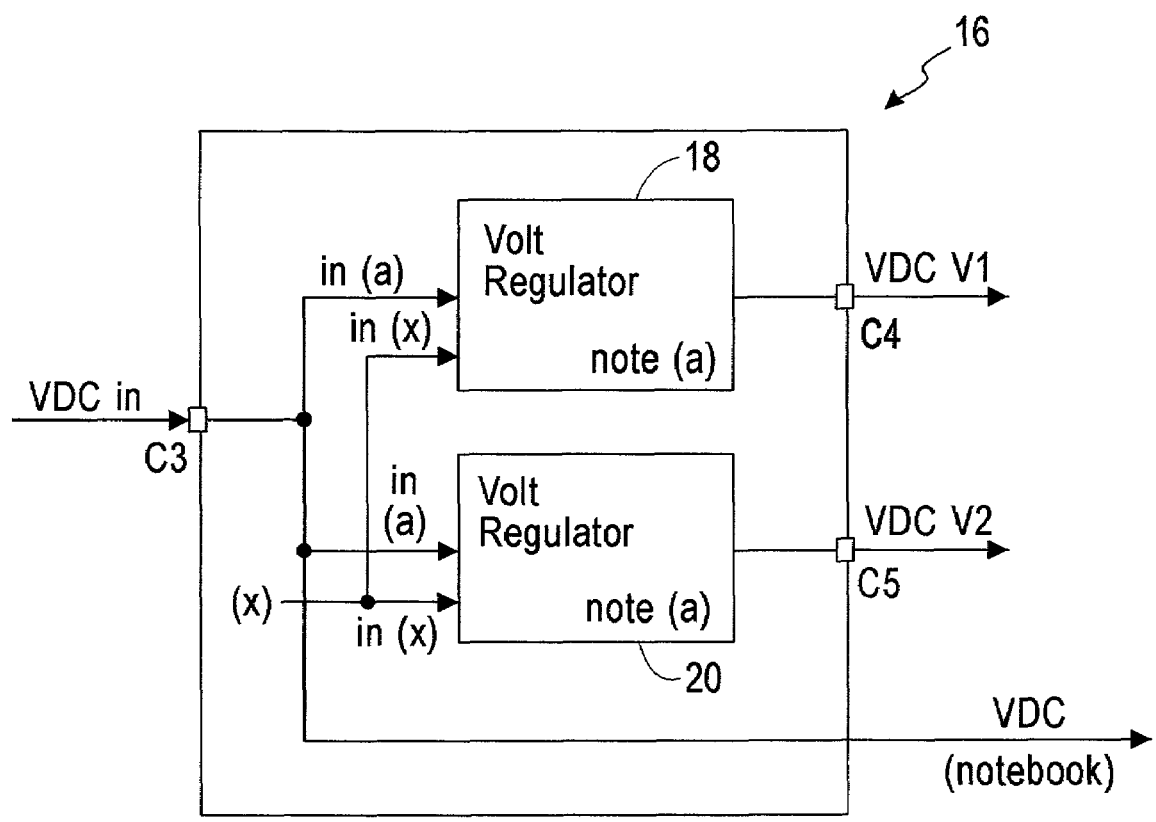
FIG. 4 shows the basic electronic circuitry of the (MD PS) used in the present invention.

FIG. 4 shows the basic structure of an electronic circuit for a (MD PS) for providing power to two power receiving devices. As already mentioned in reference to FIG. 2, (MD PS) contains for each power receiving device a separate voltage regulator (18, 20) for providing the required VDC V1 and VDC V2 to the assigned serial port (C4, C5) which may be part of the power supplying mobile device if integrated into that device or may be part of the (MD PS) itself if available as separate portable component. In both implementations the power supplying mobile device or the (MD PS) requires a port (C3) for an external power supply adapter.

Figure 5:
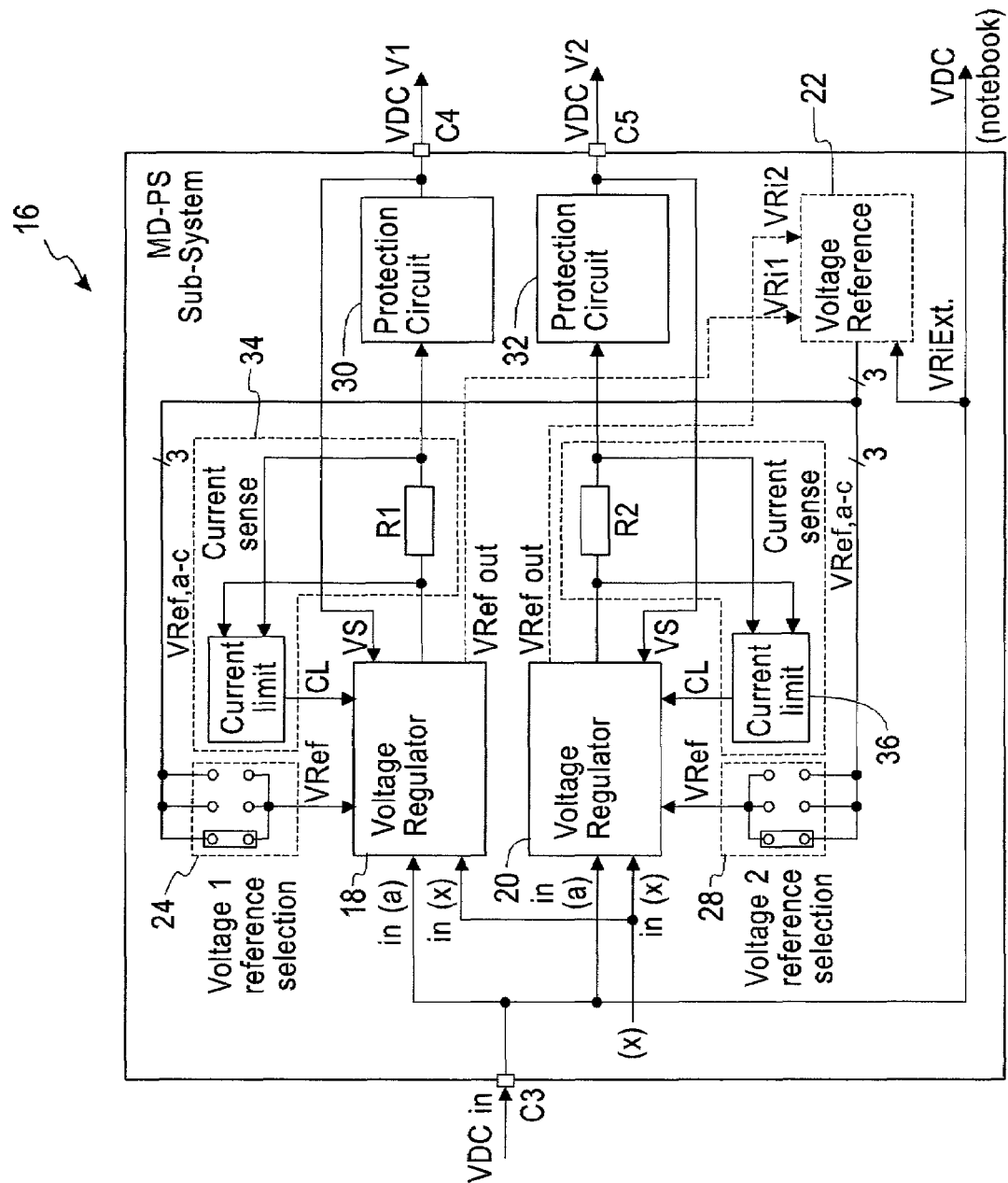
FIG. 5 shows a detailed implementation of the electronic circuitry of the (MD PS) which may be used in the present invention.

FIG. 5 shows a detailed implementation of the electronic circuitry of the (MD PS) (16) preferably used in the present invention.

The implementations as described in FIG. 2 and FIG. 3 can be realized by using the electronic circuitry of the (MD PS) as disclosed by FIG. 5. FIG. 5 illustrates a (MD PS) (16) generating and regulating two individual output voltages (VDC V1, VDC V2) thereby allowing support for two power receiving mobile devices. The voltages (VDC V1, VDC V2) are generated by two independent voltage regulator circuits (18, 20). The reference voltages (VReF) for both voltage regulators (18, 20) are generated in common by a voltage reference generator (22). The reference voltage generator (22) provides two reference voltages (VRef.a c). Each regulator (18, 20) is provided by a reference voltage selection circuit (24, 28) finally choosing one of the provided voltages (VRef.). Since a user of a mobile device especially mobile phone is typically used to connect always the same set of mobile device (mobile phone and personal assistant), a very simple cost effective scheme to select (multiplex) the reference voltage (VRef.) is proposed as shown in FIG. 5.

Two additional circuits are complementing the regulator scheme used to protect the (MD PS) from damage. These are the current sensing circuits (34, 36) and the protection circuits (30, 32).

The current sensing circuit (34, 36) is continuously measuring at the actual output current (VS). The output current measured is compared to a predefined upper current limit. In a case the limit is exceeded the current limit input C1 at the voltage regulator will be activated in consequence causing the voltage regulator to decrease the output voltage.

Protection circuits (30, 32) are used to protect the (MD PS) against high voltages statically discharges applied to VDC V1 and VDC V2 outputs.

A very simple implementation of power protection circuits can be realized by using clamping diodes for limiting the voltage to an upper level (typically VDC in) and to a lower voltages.

A further implementation of the present invention may be realized by providing an additional output to the power subsystem battery charger (X see FIG. 2) for providing power to the (MD PS) in a case no external power supply is available.

The receiving mobile device is provided with power via the connection X of the power subsystem battery charger and via the (MD PS) of the supplying mobile device. Switching on or switching off of the connection X may be realized by a standard programmable hardware switch (e.g. relay, field effect transistor). The hardware switch can be controlled by means of specific application software installed on the supplying mobile device controlling the supply of power to the receiving mobile device. For example this implementation allows one make important phone calls with the power receiving mobile device when no external power supply is available.

The invention claimed is:

1. A mobile data processing device comprising an internal power supply, a port for connecting an external power supply to the internal power supply, a power server that obtains power from the internal power supply in order to provide at least one additional reference voltage, and a further port for supplying said at least one reference voltage to at least one other independent mobile data processing device requiring said reference voltage.

2. The mobile data processing device according to claim 1, wherein said power server comprises an input with power of a certain voltage (VDC) from said internal power supply, one voltage regulator circuit for generating said reference voltage, and an output for providing said said reference voltage to an assigned power receiving device of said at least one other independent mobile data processing devices.

3. The mobile data processing device according to claim 2, further including a power subsystem and battery charger and wherein said power server further comprises an input for receiving power from said power subsystem and battery charger and a switch for controlling supply of said power to said assigned power receiving device.

4. The mobile data processing device according to claim 3, wherein said power server further comprises a reference voltage generator for providing a reference voltage to said voltage regulator circuit and a reference voltage selection circuit for choosing a device-specific reference voltage for powering said assigned power receiving device.

5. The mobile data processing device according to claim 4, wherein said voltage generator supports several independent voltage regulator circuits concurrently.

6. The mobile data processing device according to claim 5, wherein said power server further comprises a protection circuit for protection of said said power server against high voltages.

7. The mobile data processing device according to claim 6, wherein said power server comprises for each of multiple power receiving devices an independent voltage regulator circuit, an independent protection circuit, and an independent output.

8. The mobile data processing device according to claim 7, wherein said mobile data processing device comprises a notebook and said assigned power receiving device is a mobile phone.

9. The mobile data processing device according to claim 7, wherein said mobile data processing device comprises a notebook and said assigned power receiving device is a personal assistant.

10. A mobile power device that provides regulated power from an external power supply to a plurality of independent mobile processing devices, said mobile power device comprising:

an external power supply adapter port to receive an external power supply a primary port that receives power from the external power supply through said external power supply adapter, a power server connected to said primary port to power a primary mobile processing device, said power server including multiple independent voltage regulators to produce multiple power levels, and at least one supplemental port of said power server that provides said multiple regulated power levels to power at least one other mobile processing device, said at least one supplemental port being coupled to the primary port through an independent voltage regulator of said power server.

11. The mobile power device of claim 10 wherein said power server is contained within a housing of said primary mobile processing device.

* * * * *